United States Patent
Suresh

(10) Patent No.: US 6,450,553 B1
(45) Date of Patent: Sep. 17, 2002

(54) AXIAL SWAGE FITTING FOR LARGE BORE PIPES AND TUBES

(75) Inventor: Srinivas B. Suresh, Irvine, CA (US)

(73) Assignee: Mechl LLC, Irvine, CA (US)

( * ) Notice: Subject to any disclaimer, the term of this patent is extended or adjusted under 35 U.S.C. 154(b) by 0 days.

(21) Appl. No.: 09/434,626

(22) Filed: Nov. 5, 1999

(51) Int. Cl.[7] .............................................. F16L 13/14
(52) U.S. Cl. ..................... 285/382; 285/382.2; 29/520
(58) Field of Search ............................ 285/382, 382.2, 285/382.1; 29/505, 520

(56) References Cited

U.S. PATENT DOCUMENTS

| | | | |
|---|---|---|---|
| 3,477,750 A | 11/1969 | Powell | 285/363 |
| 3,579,794 A | 5/1971 | Powell | 29/237 |
| 3,596,939 A | 8/1971 | Gibson | 285/382.2 |
| 3,675,949 A | 7/1972 | Dawson | 285/354 |
| 3,726,122 A | 4/1973 | Dawson | 72/412 |
| 3,779,587 A | 12/1973 | Racine | 285/312 |
| 3,893,718 A | 7/1975 | Powell | 285/53 |
| 3,893,720 A | 7/1975 | Moebius | 285/187 |
| 4,019,232 A | 4/1977 | Hattori | 29/282 |
| 4,026,006 A | 5/1977 | Moebius | 29/508 |
| 4,061,367 A | 12/1977 | Moebius | 285/382.2 |
| 4,447,077 A | 5/1984 | Palmer | 285/104 |
| 4,482,174 A | 11/1984 | Puri | 285/382.2 |
| 4,626,001 A | 12/1986 | Lee | 285/94 |
| 4,705,302 A | * 11/1987 | Beiley | 285/382.2 |
| 4,956,904 A | 9/1990 | Yamamoto et al. | 29/237 |
| 5,088,771 A | 2/1992 | Hosseinian et al. | 285/39 |
| 5,110,163 A | 5/1992 | Benson et al. | 285/382.2 |
| 5,181,752 A | * 1/1993 | Benson et al. | 285/382.2 |
| 5,271,257 A | 12/1993 | Irwin | 72/316 |
| 5,452,921 A | 9/1995 | Hyatt et al. | 285/23 |
| 6,131,964 A | * 10/2000 | Sareshwala | 285/382.2 |
| 6,199,254 B1 | 3/2001 | Suresh | 29/237 |

FOREIGN PATENT DOCUMENTS

| | | | |
|---|---|---|---|
| FR | 2389061 | * 12/1978 | 285/382.2 |
| WO | 91/14894 | * 10/1991 | 285/382.2 |

OTHER PUBLICATIONS

Bierstake, M. et al., "Qualification of Non–Standard Piping Product Form for ASME Code for Pressure Piping, B31 Applications" ASME pp. 127–134, Reprinted from PVP, vol. 210–1, Codes & Standards & Applns. f/Design & Analysis of Pressure Vessel & Piping Components, Book No. H00636—1991.

Markl, A.R.C., "Fitigue Tests of Piping Components", pp. 1148–1164, Reprinted from Transactions ASME, 1952.

* cited by examiner

*Primary Examiner*—Eric K. Nicholson
(74) *Attorney, Agent, or Firm*—Skjerven Morrill LLP

(57) ABSTRACT

A fitting for joining pipes, tubes, or conduits improves coupling capability particularly to a large bore pipe, generally of 2 inches and larger in diameter. The fitting includes a substantially cylindrical sleeve and ring. The sleeve has an inner surface defining a bore, configured to slidably receive the pipe at an open end. The inner sleeve surface also includes protrusions, which deform the outer surface of the pipe upon swaging. The fitting also includes an outer surface having multiple stepped lands of ascending height relative to the open end. The ring has an inner surface configured to engage the multiple ascending steps on the inner sleeve surface. The inner surface of the ring has descending steps that are positioned to interfere with the multiple ascending steps on the outside of the sleeve. Axial motion of the ring causes the ring to slide over the sleeve and apply a radial swaging force directly to the multiple stepped sleeve. The swaging force makes the ring overcome the interference and push down on the multiple ascending steps of the sleeve, which swages the sleeve to the pipe. The multiple ascending steps of the sleeve are positioned relative to the descending steps of the ring, such that only one step at a time is swaged.

18 Claims, 6 Drawing Sheets

AXIAL SWAGE FITTING FOR LARGE BORE PIPES AND TUBES

BACKGROUND OF THE INVENTION

1. Field of the Invention

This invention relates to fittings and in particular to an axial swage fitting for pipes and tubes.

2. Description of Related Art

Fittings of various types are commonly used to couple tubes and pipes for a variety of applications. For example, in the aerospace industry, swage fittings are used to couple hydraulic lines, fuel lines, and the like, which convey fluids in aircraft and other vehicles. The coupling generally involves the deformation of a portion of the tube or pipe and the deformation of the fitting in response to the application of a swaging force to the fitting. The swage methodology is described in numerous patents, for example, U.S. Pat. No. 3,675,949 and U.S. Pat. No. 3,893,718.

Various fittings have been developed which use the above referenced methodology to connect tubes. For example, U.S. Pat. No. 4,482,174 discloses an apparatus having a sleeve and a locking slidable over at least the first end of the sleeve, which has a reverse taper configuration. In another example, U.S. Pat. No. 5,110,163 discloses a fitting, which generally includes a sleeve having a tapered outer surface, and a swaging ring, which may be urged over the tapered surface to secure pipes together. In yet another example, U.S. Pat. No. 5,452,921 discloses a fitting, which includes a sleeve having a tapered outer surface, and a swaging ring, having a matching tapered surface. During swaging, the swaging ring is moved axially over the sleeve, such that the tapered surfaces interact to apply a radial force on the sleeve inwardly into the pipe to make a swaged connection.

Although, swage fittings are well known in the industry, swaging techniques are not widely used on pipes and tubes with large diameters, in high pressure applications. One reason for this is that, existing swaged fitting designs generally lack the requisite pipe retention capability, necessary for large bore, high pressure applications. Moreover, since most swaged fittings are not designed for large bore pipes, the swaging force necessary to deform the sleeve and pipe during swaging, is usually beyond the capability of existing swaging tools. The high strength and force requirements of such applications, tend to drive the relative size of the fitting, the swaging time, and the costs associated with manufacture, to prohibitive levels.

Another reason that the use of swaged fittings has generally gone unexplored for use with large diameter bore pipes, in high pressure applications, is that alternative, conventional, non-swaging means already exist for these applications. Generally, large bore pipes and tubes, used in high pressure applications, may be coupled together using welds, flange and bolt connections, and threaded engagements. Although, these types of connections are commonplace, they are generally plagued with a variety of drawbacks, which make them high cost, high risk, and/or time consuming alternatives to the present invention. For example, welded pipe joints usually require additional pre- and post-weld preparation events that are usually expensive and time consuming, such as pipe end preparation, post weld, grinding, non destructive inspection and hydro-testing. Welds in pipes have also been known to fail at weak spots in heat affected areas adjacent to the welds. Moreover, welding in the vicinity of potentially flammable fluids such as fuel and oil which may be used in the pipes or tubes, is inherently risky. Flanged and bolted connecting systems require that the pipe ends be flared prior to use which may be inconvenient, expensive, and time consuming. To create the joint, the flanges are bolted together with a gasket in between to provide a seal. In many instances vibrations or other general usage may loosen bolts and cause leaks. Moreover, gaskets are prone to failure after time or are easily damaged, which may further result in leaks. Threaded systems, require pipe ends to be threaded, which can be time consuming and ineffective. Generally, an abundance of access space is necessary for using wrenches and the like to couple the threaded pipes. Typically, a sealant is used on the threads to fill gaps and prevent leaking. However, after a period of time, the sealant can deteriorate, which leads to leaking.

For the above reasons, what is needed is an axially swaged fitting that provides an improved coupling and sealing capability between pipes and tubes, especially large bore pipes and tubes for use in high pressure applications.

SUMMARY OF INVENTION

The present invention provides a fitting for joining pipes, tubes, or conduits (hereinafter collectively "pipes"). Preferably, the fitting improves couplings of a large bore pipe, generally of 2 inches and larger in diameter. The improved coupling capability is a result of an enhanced tensile strength capacity in the fitting that keeps forces, which may result from high burst pressures and the like, from pulling a pipe axially away from the fitting The fitting includes a substantially cylindrical sleeve, which has an inner surface defining a bore, configured to slidably receive the pipe at an open end. The inner surface of the sleeve includes protrusions, which grip the outer surface of the pipe upon swaging. The outer surface of the sleeve includes multiple stepped lands of ascending height relative to the open end. The fitting further includes a substantially cylindrical swaging ring. An inner surface of the swaging ring includes multiple contact surfaces of descending height configured to engage the multiple ascending steps on the sleeve with an interference fit. Axial motion of the swaging ring causes the swaging ring to slide over the sleeve and apply a radial swaging force directly to the multiple stepped sleeve. The swaging force makes the ring overcome the interference and inwardly push the multiple ascending steps of the sleeve, which swages the sleeve to the pipe. Advantageously, the multiple ascending steps of the sleeve are positioned relative to the descending steps of the ring, such that only one stepped portion at a time is swaged.

One embodiment of the present invention is a fitting for joining pipes by swaging. The fitting includes a sleeve which defines a bore, which is sized to receive a pipe. The sleeve has an inner surface and an outer surface. The outer surface includes a first stepped portion, which has a first dimension, and a second stepped portion, which has a second dimension. The fitting also includes a ring, which has an inner surface configured to engage the first and second stepped portions. While engaging the first stepped portion the ring alters the first dimension and, while engaging the second stepped portion, alters the second dimension which causes the sleeve to be swaged to the pipe.

In another embodiment of the present invention is a fitting for attachment to a pipe by swaging. The fitting includes a sleeve and a ring. The sleeve defines a bore configured to receive a pipe and has an outer surface, with a first stepped portion and a second stepped portion. The ring has an inner surface including a first contact portion configured to deform the first stepped portion, and a second contact portion configured to deform the second stepped portion in response to an axial movement of the ring.

In yet another embodiment of the invention, a method for joining pipes by swaging includes deforming a first stepped portion of a sleeve with a radial swaging force provided by a swaging ring; and thereafter deforming a second stepped portion of the sleeve with the radial swaging force provided by the swaging ring.

The present invention provides many advantages over other swaging techniques. Since the multiple ascending steps of the sleeve may be swaged one step at a time, the swage force required to create a seal may be minimized. The fitting couples pipes in a safer more reliable, and easier to use, manner than do most current pipe coupling methods and devices. Advantageously, the fitting may be locked into position to ensure that the fitting stays in position while experiencing vibrations or other adverse environmental effects. Moreover, the fitting provides a hermetical seal that can be made relatively quickly and cost effectively for the rated pressure of the pipe being joined. The seal also provides substantial torque resistance.

These and other features and advantages of the present invention will be more readily apparent from the detailed description of the preferred embodiments set forth below taken in conjunction with the accompanying drawings.

DETAILED DESCRIPTION OF SPECIFIC EMBODIMENTS

Embodiments of the present invention will be described with reference to the aforementioned figures. These figures have been simplified for ease of understanding and describing the embodiments.

Figure 1:
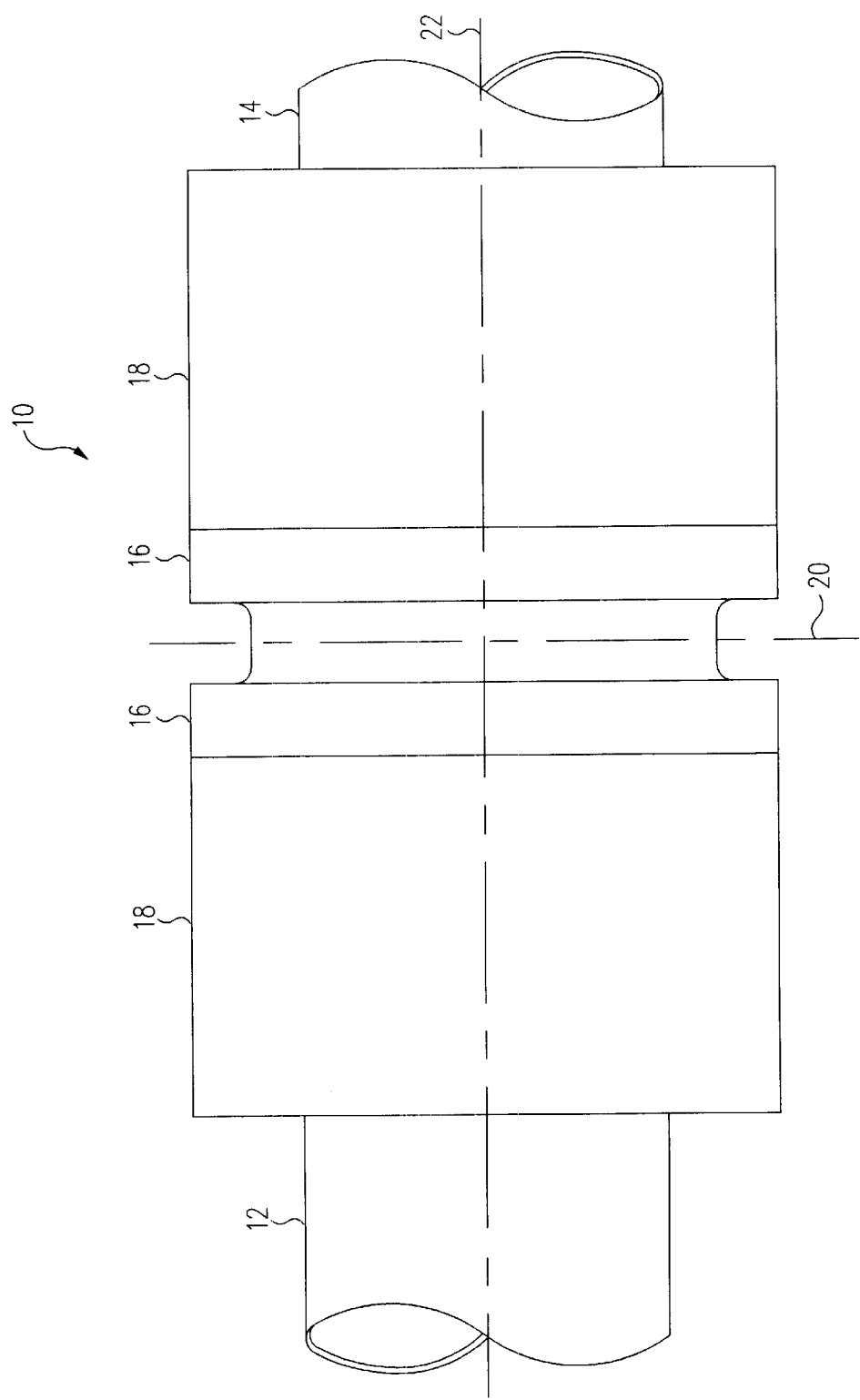
FIG. 1 is a simplified external view of the fitting of the present invention.

FIG. 1 is an external view of a fitting 10 in accordance with an embodiment of the present invention. Fitting 10, which includes a sleeve 16 and two swage rings 18, can be used equally well to secure together pipes, tubes, conduits, and the like. As shown in FIG. 1, fitting 10 is broadly symmetrical about centerline 20 and central axis 22. Thus, the description of fitting 10 will be directed to only one end of fitting 10, with reference to the other end, only when necessary to describe a feature of the invention, since it is understood that the other end is structurally and functionally the same. However, depending on the application for fitting 10, a complete fitting may include only one end of fitting 10, such as when the fitting is used to cap the end of a pipe. Moreover, fitting 10 is not limited to use for joining pipes of equal size, in a straight line. Optionally, the second side of fitting 10 may be used in other applications, as for example an elbow, a reducer, a tee, and the like.

Fitting 10 provides a reliable hermetically sealed pipe joint between pipe sections 12 and 14. Fitting 10 creates a high strength connection that prevents the pipe sections from being pulled axially apart and out from fitting 10, which may be caused by substantial burst pressures. Accordingly, sleeve 16 may be made from a material with a high tensile strength, such as any homogenous malleable material, including steel, aluminum, copper, brass, titanium, and the like. Swage ring 18, may also be any homogenous malleable material of equal or greater strength. Alternatively, sleeve 16 and ring 18 may be made from high strength plastics, polymers, and composites, that provide the requisite strength. Preferably, the materials in fitting 10 provide a tensile strength of no less than 80 kpsi, preferably no less than 86 kpsi. Accordingly, fitting 10 may be rated for use in high pressure applications, for example, an application with burst pressures experienced during normal fluid flow operations of between about 3000 psi and 12,000 psi.

Figure 2:
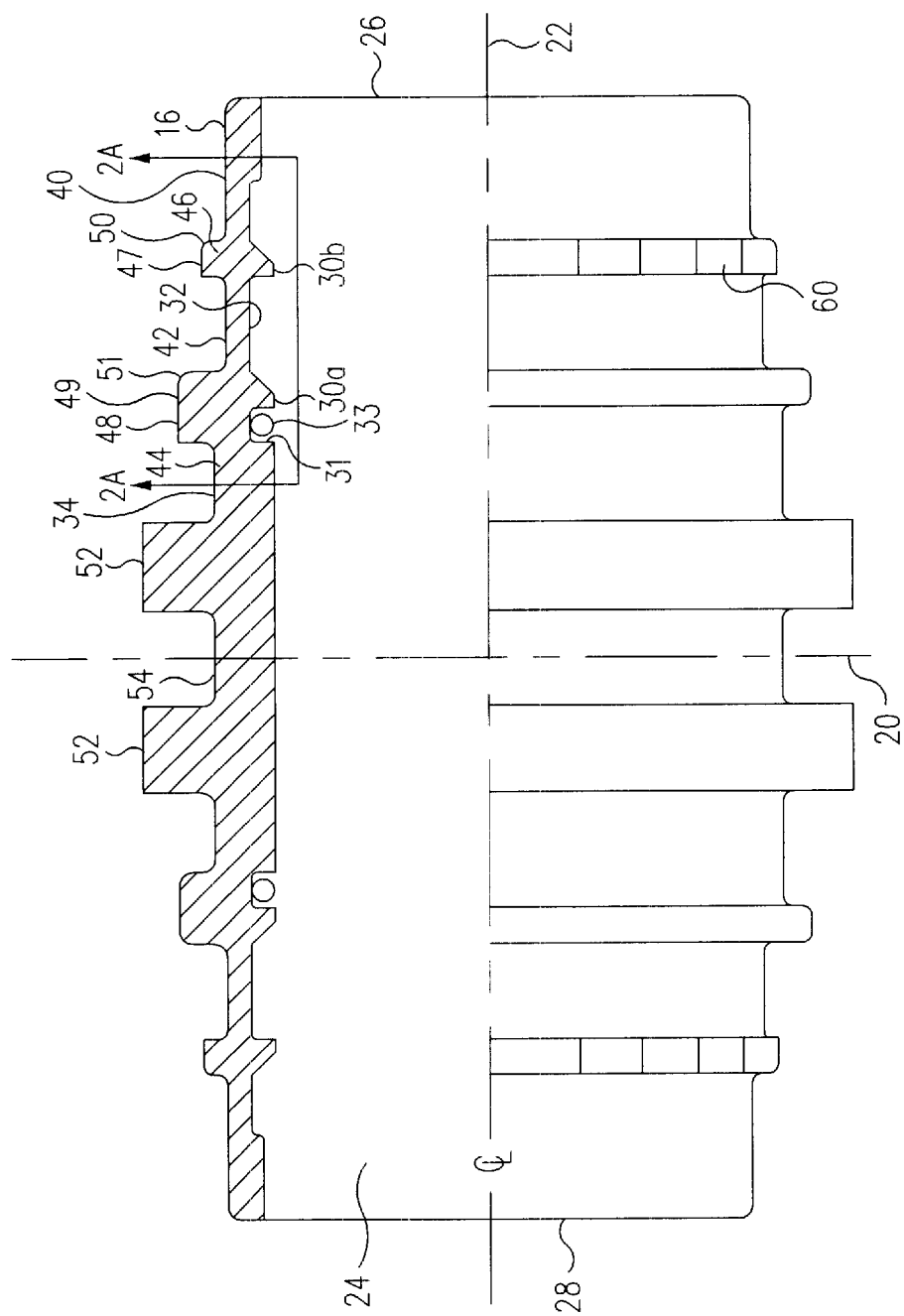
FIG. 2 is a simplified partial sectional view of a sleeve used in the fitting of FIG. 1 in accordance with the present invention.

FIG. 2 illustrates a partial sectional view of sleeve 16, showing a first open end 26 and a second open end 28, with a hollow cylindrical bore 24 extending therebetween. In a preferred embodiment, cylindrical inner bore 24 slidably receives two separate pipe sections. Bore 24 may be sized to fit any diameter pipe sections. In a preferred embodiment, bore 24 receives large bore pipes, such as pipes with external diameters of 2 in. or larger. Pipes for use with fitting 10 may be made of any conventional pipe material, such as steel, copper nickel, titanium, and the like, and may be of any wall thickness, for example between about SCH 5 and SCH 80.

Figure 2A:
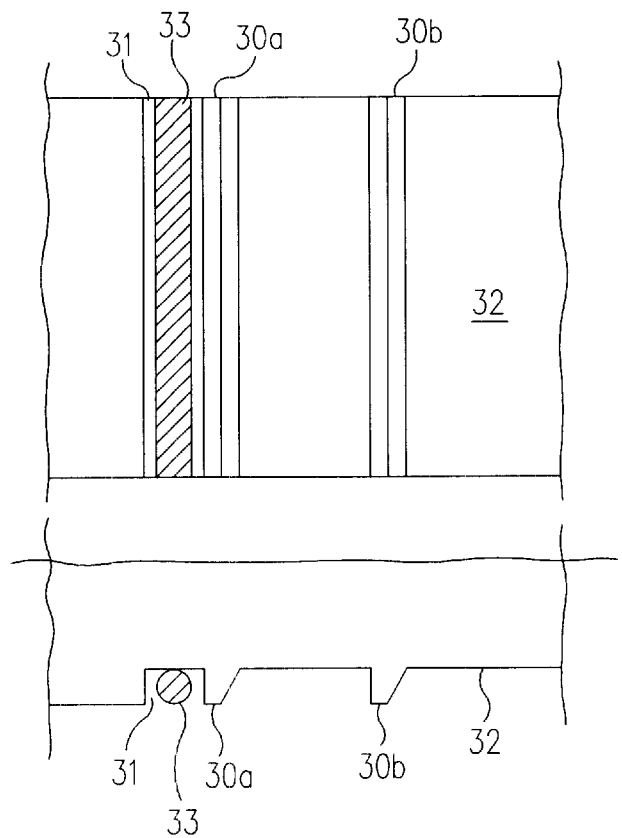
FIG. 2A is a sectional view of an embodiment of the inner surface of the sleeve of FIG. 2.

Sleeve 16 has an inner sleeve surface 32 and an outer sleeve surface 34. As best illustrated in FIG. 2A, inner sleeve surface 32 may include protrusion rings 30a and/or 30b, formed circumferentially on inner sleeve surface 32. Protrusion ring 30a and/or 30b may be a solid continuous ring or, alternatively, protrusion ring 30a and/or 30b may be a segmented ring, which forms a ring of "teeth." In the preferred embodiment, protrusion rings 30a and 30b are continuous rings, with a chamfered edge to provides increased gripping potential. The protrusions are sufficiently shaped and sized to provide a gripping action when made to contact and deform the outer surface of a pipe section. Each protrusion ring 30a or 30b, is designed sufficiently wide and with an appropriate profile, such that the ring resists tensile loading along axis 22 of the pipe. Such tensile loads may occur as a result of forces tending to pull the pipe sections out of fitting 10, for example, from high pressures developing from the fluid within the pipe.

Protrusion ring 30a is inboard of teeth ring 30b, but both rings 30a and 30b substantially engage the surface of the pipe section. The effective height of the protrusion rings 30a and 30b may be between about 0.05" and 0.125", preferably 0.08". For maximum tensile strength, protrusion rings 30a and 30b may cause a pipe deformation (FIG. 5), which may be between about 2% and 9% deformation of the pipe diameter. Ring 30a also provides a hermetical seal, such that no fluid flowing through the pipe is allowed to escape fitting 10. To increase the effectiveness of the seal, O-ring groove 31 may be formed into inner surface 32. A soft O-ring 33, may be placed into groove 31 prior to swaging. Preferably, groove 31 with O-ring 33 is proximate to, and inboard of, protrusion ring 30a. The O-ring type depends on the piping system application.

Although the description of the protrusion rings refers to two protrusion rings, any number of rings may be used as desired. Also, other means exist for causing sleeve 16 to securely grip the pipe section which will be evident to those skilled in the art, and therefore protrusion rings 30a and 30b shown in the figures should not be construed as limiting the invention.

Figure 2B:
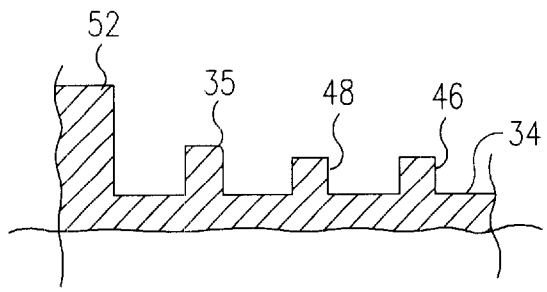
FIG. 2B is a sectional view of an embodiment of the outer surface of the sleeve of FIG. 2.

Referring once again to FIG. 2, outer sleeve surface 34 includes an initial outer facing cylindrical surface 40, which facilitates the initial engagement with an inner surface of ring 18. The initial surface 40 maintains a constant diameter up until first stepped portion 46. First stepped portion 46, has a raised land portion 47 relative to initial surface 40. The difference in height between land 47 and initial surface 40, may be varied depending on the application. Preferably, the height is between about 0.05 and 0.2 in., for example, about 0.1 in. The width of land 47, as measured along axis 22, may also be variable, but preferably is no greater than 0.5 in. A rounded leading edge 50 is on first stepped portion 46 facing outward to end 26, which provides for a smooth engagement between first stepped portion 46 and a portion of ring 18. The leading edge radius may be between about 0.06 in. and 0.15 in., preferably about 0.125 in. A second surface 42 follows between first stepped portion 46 and a second stepped portion 48. Second stepped portion 48, has a raised land portion 49 relative to second surface 42. The difference in height between land 49 and second surface 42, may be varied depending on the application. Preferably, the height is between about 0.1 and 0.3 in., for example, 0.2 in. The width of land 49, as measured along axis 22, may also be variable, but preferably is no greater than about 0.5 in. A rounded leading edge 51 is provided on second stepped portion 48 facing outward to end 26, which provides for a smooth engagement between the second step and a portion of ring 18. The leading edge radius may be between about 0.06 and 0.15 in., preferably 0.125 in. Following second stepped portion 48 is a third surface 44, which has a constant diameter, greater than the diameter of the second surface 42, but less than the height of second stepped portion 48. Although only two stepped portions have been described it should be understood that additional stepped portions may be included. For example, as shown in FIG. 2B a third stepped portion may be on outer sleeve 34, positioned between second stepped portion 48 and stop flange 52.

In this embodiment, at the end of third surface 44 is stop flange 52. As described in greater detail below, stop flange 52 prevents the axial progress of ring 18 as ring is urged over sleeve 16. Stop flange 52 is a strong, ring-type flange, which also may be used for supporting one side of a swage tool. The present invention has two stop flanges 52, separated by a groove 54. Groove 54 may be used to accommodate the swage tool during swaging. An exemplary swage tool for use with fitting 10 is fully described in co-filed U.S. patent application Ser. No. 09/434,632, filed Nov. 5, 1999, now U.S. Pat. No. 6,199,254 B1, issued Mar. 13, 2001, which is fully incorporated herein by reference for all purposes.

Figure 3:
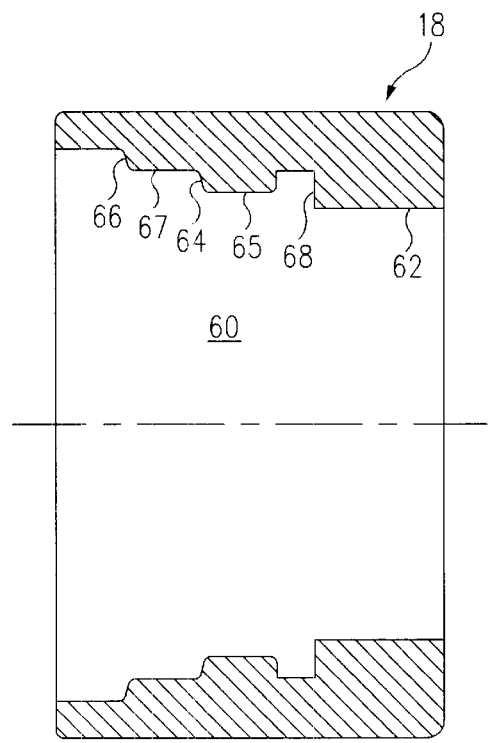
FIG. 3 is a simplified partial cross-sectional view of a ring used in the fitting of FIG. 1 in accordance with the present invention.

FIG. 3 shows a cross-sectional view of swaging ring 18 in accordance with an embodiment of the present invention. Swaging ring 18 applies a swaging force, as required, to swage sleeve 16 onto the pipe sections, as ring 18 is urged over sleeve 16. Swaging ring 18 has a cylindrical outer body, which has an inner bore 60 defined therein. The inner bore 60 engages the outer sleeve surface 34 of sleeve 16 in a manner that causes the sleeve to be deformed. Inner ring surface 62 of ring 18 has a first contact portion 64 and a second contact portion 66. First contact portion 64 further defines a land 65, while second contact portion 66 defines a land 67. Contact lands 65 and 67 are each configured to engage step lands 47 and 49, respectively, with an interference fit. In a preferred embodiment, contact land 65 engages with step land 47 prior to contact land 67 contacting step land 49. In this manner, first stepped portion 46 is deformed before second stepped portion 48 is deformed. Advantageously, the amount of swaging force required to be applied by ring 18 to sleeve 16 is reduced. Inner surface 62 of ring 18 also includes a locking groove 68, the use of which is described in greater detail below.

Figure 4:
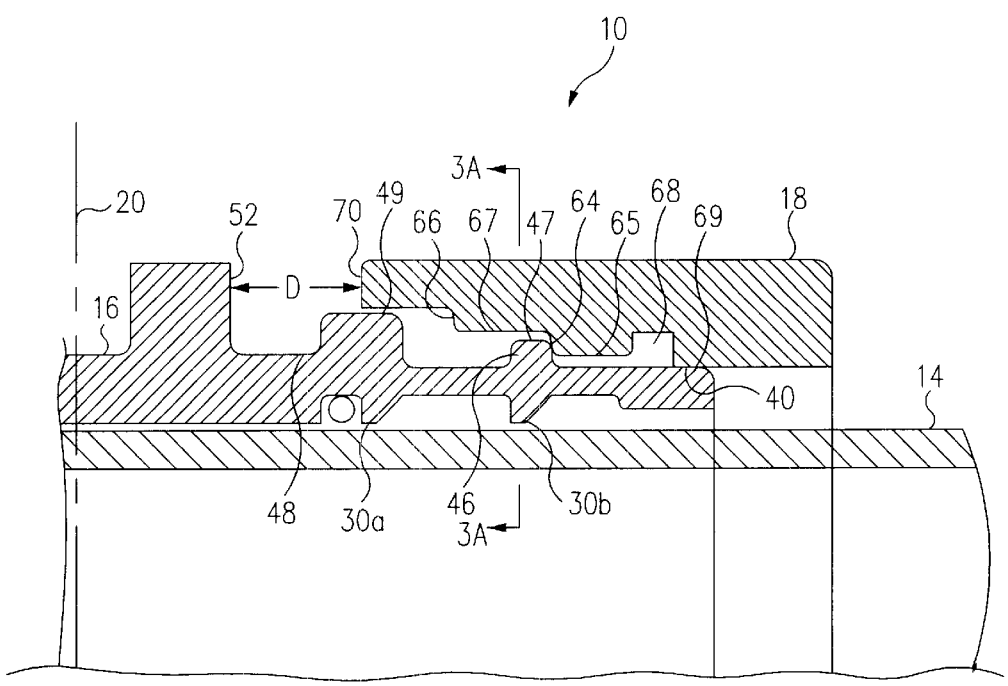
FIG. 4 is a simplified partial cross sectional view of the fitting of FIG. 1, shown in a pre-swage configuration.
Figure 5A:
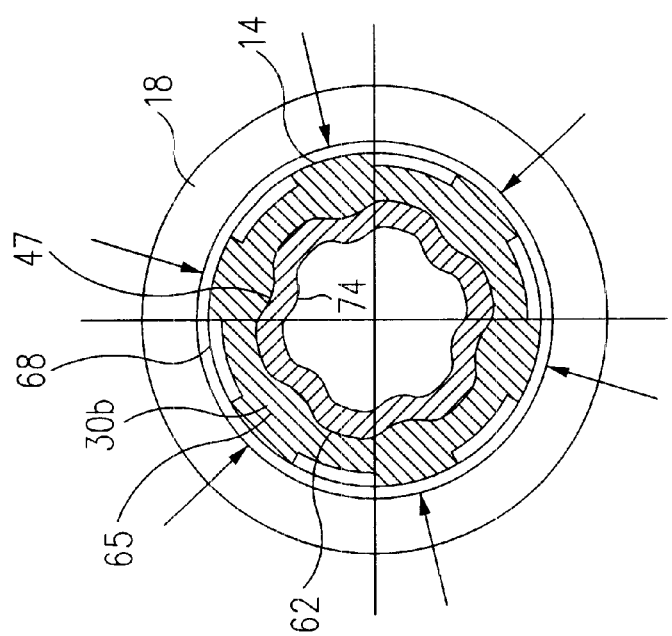
FIG. 5A is a simplified cross-sectional view through a section of the fitting in the post-swage configuration.
Figure 5:
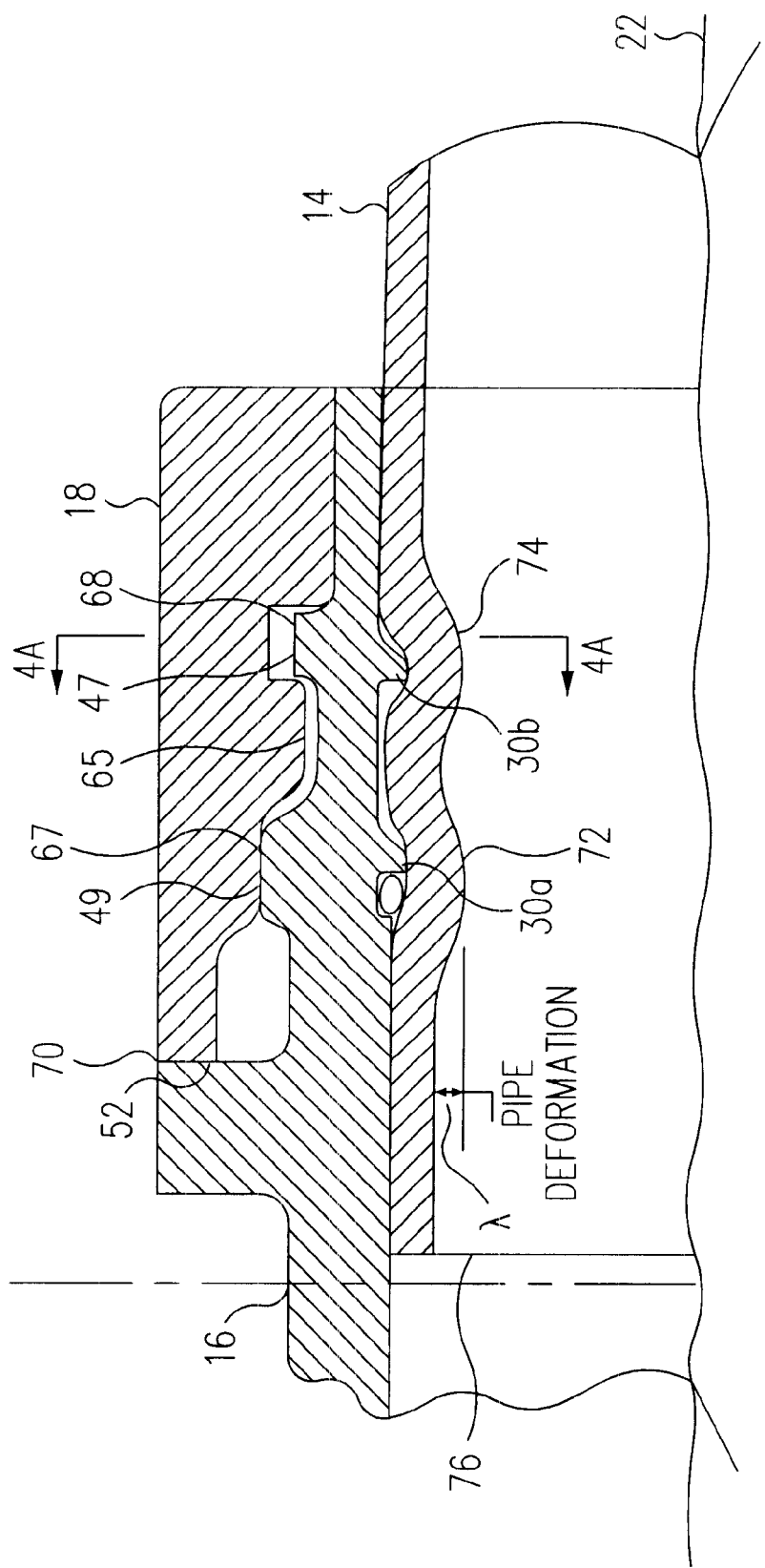
FIG. 5 is a simplified partial cross sectional view of the fitting of FIG. 1, shown in a swaged configuration.

FIGS. 4 and 5 will be described with regard to the use of fitting 10. FIG. 4 is a simplified partial cross sectional view of fitting 10 in a pre-swage configuration. Initially, in the pre-swage configuration, swaging ring 18 is made to contact initial surface 40 at surface 69. Swaging ring 18 snugly engages initial surface 40, such that ring 18 is held in position, in preparation for being moved over sleeve 16.

To swage sleeve 16, swaging ring 18 is urged axially over sleeve 16 along axis 22 a distance D, from the first pre-swage position shown in FIG. 4, to the second post-swage position shown in FIG. 5. In one exemplary operation of the invention, land 65 of first contact portion 64 is made to ride over land 47 of first stepped portion 46. As a result of the interaction between first contact portion 64 and first stepped portion 46, swage ring 18 applies a radial force to first stepped portion 46. The radial swage force elastically deforms first stepped portion 46 in an inward direction to swage sleeve 16 to pipe section 14. Since protrusion ring 30b is immediately below first stepped portion 46 on inner surface 32, protrusion ring 30b is pressed inward into a surface of pipe section 14.

Figure 4A:
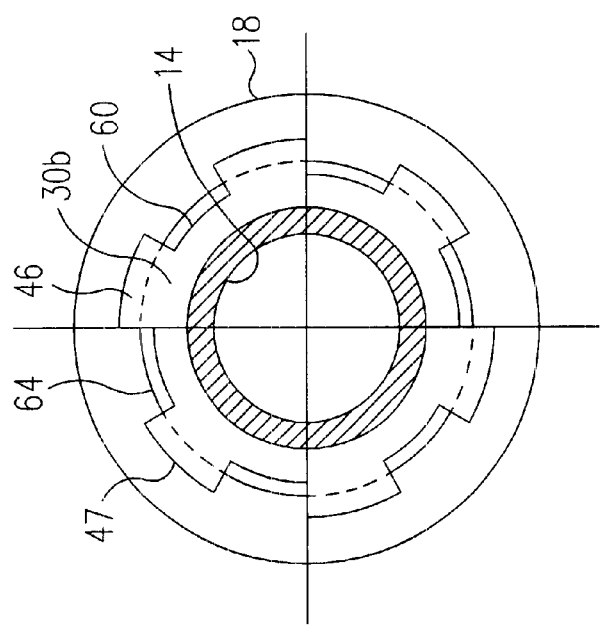
FIG. 4A is a simplified cross-sectional view through a section of the fitting in the pre-swage configuration.

In one embodiment, as best understood with reference to FIG. 4A, first stepped portion 46 of sleeve 16 may be discontinuous or segmented about the circumference of first stepped portion 46. In this embodiment, indentations or grooves 60 may be milled or otherwise machined into first stepped portion 46. First stepped portion 46 may then resemble the wave form as shown in FIG. 4A.

As shown in FIG. 5A, when contact land 65 deforms step land 47, a waveform circumferencial deformation of pipe section 14 occurs. The discontinuous deformation traps a portion 62 of the pipe, such that the pipe is able to resist a torque applied during use.

Referring once again to FIG. 4 and to FIG. 5, in one embodiment, after first stepped portion 46 is deformed, swaging ring 18 may be further urged along axis 22, so that land 67 of second contact portion 66 rides over land 49 of second stepped portion 48 to elastically deform the second step. Accordingly, the radial force that the interaction supplies between ring 18 and second stepped portion 48, elastically deforms the second stepped portion inwardly pressing protrusion ring 30a down onto the surface of pipe section 14 to complete the seal. At the end of the swaging operation, the deformed area created by the interaction of sleeve 16 and pipe 14 creates a necked-down waveform, referred to as a bell mouth, at the inner end 76 of pipe section 14. The bell mouth enhances the gripping capability and pressure containment capacity of the fitting. Waveforms 72 and 74, are formed into pipe section 14 as a result of the compression of protrusion rings 30a and 30b. Waveform 72 provides a sealing function, while both waveforms 72 and 74 enhance the tensile strength of the joint. Ideally, 360° metal-to-metal sealing is achieved between pipe section 14 and inner sleeve surface 32, which improves resistance to flexure and pressure loading on fitting 10. In the event pipe section 14 has a poor external surface (e.g., is deeply scratched or dimpled), it may be necessary to coat pipe section 14 with a sealant, such as LOCTITE sealing compound or similar material, to fill the deficiencies in the pipe surface.

As shown in FIG. 5, in a preferred embodiment, advancement of swaging ring 18 continues until forward end 70 of ring 18 contacts stop flange 52. This ends the swaging operation, at which point locking groove 68 is positioned over first stepped portion 46, where the first stepped portion 46 springs back into groove 68, locking swage ring 18 and sleeve 16, and inhibiting any further axial movement of swaging ring 18. The locking configuration thus described prevents swaging ring 18 from backing off sleeve 16, for example, due to severe vibrations and the like.

Although particular embodiments of the invention have been illustrated and described, modifications and changes may become apparent to those of skill in the art. It is intended that the appended claims cover all such evolution, changes and modifications as come within the scope of the invention.

What is claimed is:

1. A fitting for attachment to a pipe by swaging, said fitting comprising:

a sleeve defining a bore and having an inner surface and an outer surface, said bore being configured to receive a pipe, said outer surface including a first stepped portion having a first dimension and a second stepped portion having a second dimension;

a ring having an inner surface defining a first contact portion configured to engage said first stepped portion to alter said first dimension and defining a second contact portion configured to engage said second stepped portion to alter said second dimension as said ring is urged axially over said sleeve which causes said sleeve to be swaged to said pipe; and a locking groove configured on said ring to receive and engage said first stepped portion of said sleeve after said first contact portion has been removed therefrom to prevent said ring from being removed from said sleeve.

2. The fitting of claim 1, wherein said inner surface of said sleeve comprises at least one protrusion being configured to grasp said pipe to form a secure connection between said sleeve and said pipe.

3. The fitting of claim 1, wherein said first stepped portion has grooves formed circumferentially on said first stepped portion.

4. The fitting of claim 1, wherein said sleeve comprises a third stepped portion disposed on said sleeve.

5. The fitting of claim 4, wherein said inner surface of said ring comprises a third contact portion being configured to deform said third stepped portion as said ring is urged axially over said sleeve.

6. The fitting of claim 1, wherein said bore has a diameter greater than about 2 inches.

7. The fitting of claim 1, wherein said ring comprises a material taken from group-consisting of steel, aluminum, copper, brass, and titanium.

8. The fitting of claim 1, wherein said sleeve comprises a material taken from a group consisting of steel, aluminum, copper, brass, and titanium.

9. The fitting of claim 1, wherein said sleeve further comprises an O-ring groove formed beneath said second stepped portion.

10. A fitting for attachment to a pipe by swaging, said fitting comprising:

a sleeve defining a bore and having an inner surface and an outer surface, said bore being configured to receive a pipe, said outer surface including a first stepped portion and a second stepped portion;

a ring including an inner surface having a first contact portion being configured to deform said first stepped portion and a second contact portion being configured to deform said second stepped portion in response to an axial movement of said ring; and a groove defined on said ring and configured to capture a portion of said first stepped portion of said sleeve after said first contact portion has been removed therefrom to prevent said ring from substantially moving relative to said sleeve.

11. The fitting of claim 10, wherein said inner surface of said sleeve comprises at least one protrusion that is substantially below said first stepped portion and configured to grasp said pipe to form a connection between said sleeve and said pipe.

12. The fitting of claim 11, wherein said inner surface of said sleeve comprises at least one protrusion that is substantially below said second stepped portion and configured to grasp said pipe to form a secure connection between said sleeve and said pipe.

13. The fitting of claim 10, wherein said deformation of said first stepped portion and deformation of said second stepped portion both comprise a change in a dimension of said first and said second stepped portions.

14. A method for joining pipes by swaging using a fitting including a sleeve and a swaging ring, said method comprising:

deforming a first stepped portion of the sleeve with a radial swaging force provided by said swaging ring; and thereafter deforming a second stepped portion of the sleeve with said radial swaging force provided by said swaging ring.

15. The method of claim 14, wherein said deforming of said first stepped portion and said second stepped portion comprises urging said swaging ring axially over said sleeve.

16. The method of claim 14, wherein said deforming of said first stepped portion comprises deforming a portion of said pipe with a protrusion positioned on an inner surface of said sleeve.

17. The method of claim 16, wherein said protrusion is segmented.

18. The method of claim 14, wherein said first stepped portion has grooves formed circumferentially on an outer diameter of said first stepped portion, said grooves providing improved torque resistance for said fitting.

* * * * *

UNITED STATES PATENT AND TRADEMARK OFFICE
CERTIFICATE OF CORRECTION

PATENT NO. : 6,450,553 B1 Page 1 of 1
APPLICATION NO. : 09/434626
DATED : September 17, 2002
INVENTOR(S) : Srinivas B. Suresh It is certified that error appears in the above-identified patent and that said Letters Patent is hereby corrected as shown below:

On the Title Page, Item (73) Assignee:

Delete "Mechl" and insert --Mech1--

Signed and Sealed this

First Day of July, 2008

JON W. DUDAS
*Director of the United States Patent and Trademark Office*